(12) United States Patent
Tolle et al.

(10) Patent No.: US 6,697,267 B2
(45) Date of Patent: Feb. 24, 2004

(54) VOLTAGE CONVERTER

(75) Inventors: Tobias Georg Tolle, Aachen (DE);
Thomas Duerbaum, Langerwehe (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 43 days.

(21) Appl. No.: 10/170,029

(22) Filed: Jun. 12, 2002

(65) Prior Publication Data

US 2002/0191420 A1 Dec. 19, 2002

(30) Foreign Application Priority Data

Jun. 13, 2001 (DE) .......................................... 101 28 687

(51) Int. Cl.⁷ ............................................. H02M 3/335
(52) U.S. Cl. ........................................... 363/17; 363/98
(58) Field of Search ............................. 363/17, 25, 26, 363/98, 131, 132

(56) References Cited

U.S. PATENT DOCUMENTS

| | | | |
|---|---|---|---|
| 5,402,329 A | 3/1995 | Wittenbreder, Jr. | 363/16 |
| 5,808,879 A | 9/1998 | Liu et al. | 363/17 |
| 6,370,039 B1 * | 4/2002 | Telefus | 363/15 |

* cited by examiner

Primary Examiner—Jessica Han

(57) ABSTRACT

In a voltage converter including a half bridge in the form of controlled semiconductor switches, a transformer and a rectifier circuit, in which a primary winding of the transformer connected in series with at least one capacitor is connected to the half bridge, the at least one capacitor is arranged such that the resonant frequency of the series combination of the at least one capacitor and an inductance which inductance is active when the rectifier circuit is in operation, is larger than half the pulse frequency with which the semiconductor switches are controlled. Similar measures can also be carried out with a voltage converter with a direct coupling, in which a longitudinal coil and a transverse coil then substitute for the transformer.

5 Claims, 5 Drawing Sheets

VOLTAGE CONVERTER

The invention relates to a voltage converter comprising a half bridge of controlled semiconductor switches, a transformer and a rectifier circuit, a primary winding of the transformer in series with at least one capacitor being connected to the half bridge.

Voltage converters of the generic type are known for various purposes and in several versions. By connecting a rectifier in series, the voltage converters may also be used as a power supply unit for electronic devices. They are not only used for generating one or more DC voltages but also for the DC isolation of the mains supply and the powered circuits.

Such circuits are described in, for example, U.S. Pat. No. 5,808,879 and U.S. Pat. No. 5,402,329 and have characteristic features such as switching at zero-crossing, control by pulse-width modulation, fixed operating frequency, optimum resetting of the transformer core, utilization of the stray inductance of the transformer, reduced power load of the semiconductor circuit and low electromagnetic perturbing radiation. These circuits work with a largely constant voltage across the capacitor within a respective half wave, so that the capacitor is only used as a coupling capacitor so as to avoid a direct current showing up in the primary winding of the transformer. This is particularly described in U.S. Pat. No. 5,808,879, column 6, line 42. This document describes a linear current waveform (see U.S. Pat. No. 5,808,879, FIG. 5 and U.S. Pat. No. 5,402,329, FIGS. 6b to 6f).

It is an object of the present invention to provide a voltage converter that has increased efficiency and reduced cost compared with the known voltage converters.

According to the invention this object is achieved in that the at least one capacitor is designed such that the resonant frequency of the series combination comprising the at least one capacitor and an inductance that is active when the rectifier circuit is in operation is larger than half the pulse frequency with which the semiconductor switches are controlled. The active inductance may then be formed by the stray inductances of the transformer. If these inductances cannot meet the specific requirements, according to a further embodiment it could also be provided that a coil is connected in series with the transformer and the at least one capacitor. This coil may be situated on the primary side or secondary side.

With the invention the capacitor causes not only DC isolation to occur, but also influences the current path through the primary winding of the transformer, so that the peak currents are reduced and more cost-effective components can be used with the same output power or, while maintaining the components, a higher output power can be realized. The higher output power is achieved by the steeper rise of current at the beginning of the half cycle.

These properties permit the use of a transformer that has lower specific requirements, for example, a higher stray inductance.

An advantageous embodiment of the voltage converter according to the invention consists of the fact that a series combination of the primary winding and the at least one capacitor is connected between the tapping point and one of the end points of the half bridge. The capacitor may then be connected to the tapping point—that is, the connection point between the semiconductor switches—and the primary winding to the end point and the other way round.

Another advantageous embodiment consists of the fact that two capacitors form a further bridge arm and that the primary winding is connected between the tapping point of the half bridge and that of the further bridge arm.

The invention further relates to a voltage converter comprising a half bridge of controlled semiconductor switches, a longitudinal coil and a transverse coil being connected in series with at least one capacitor to the half bridge and a rectifier circuit being connected in parallel to the transverse coil. Such a voltage converter is described, for example, in Poon N. K. and Pong M. H.: "A Novel ZVS Direct Coupling Converter (DCC)" in IEEE PESC, 1996, pp. 94 to 99.

With a voltage converter of this type the object according to the invention is achieved in that the at least one capacitor is dimensioned such that the resonant frequency of the series combination of the at least one capacitor and the longitudinal coil is larger than half the pulse frequency with which the semiconductor switches are controlled.

These and other aspects of the invention are apparent from and will be elucidated, by way of non-limitative example, with reference to the embodiment(s) described hereinafter.

Figure 7:
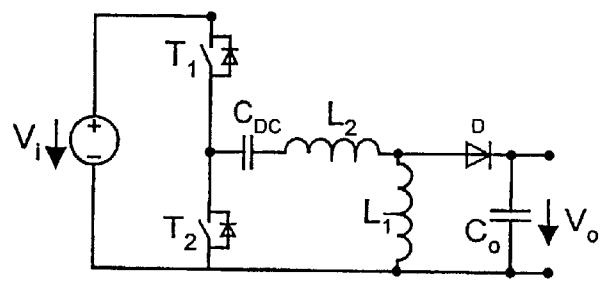
Figure 8:
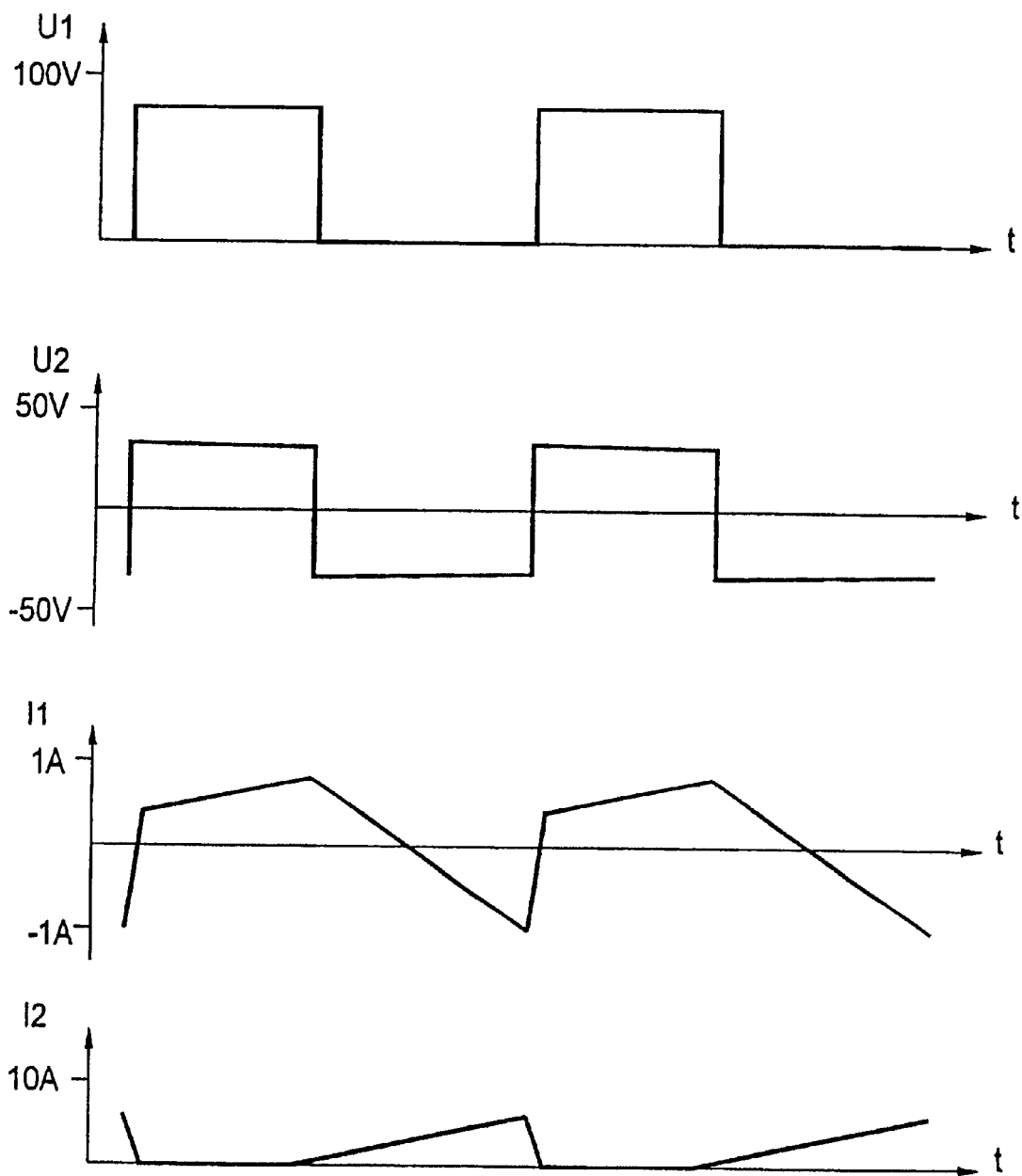
Figure 9:
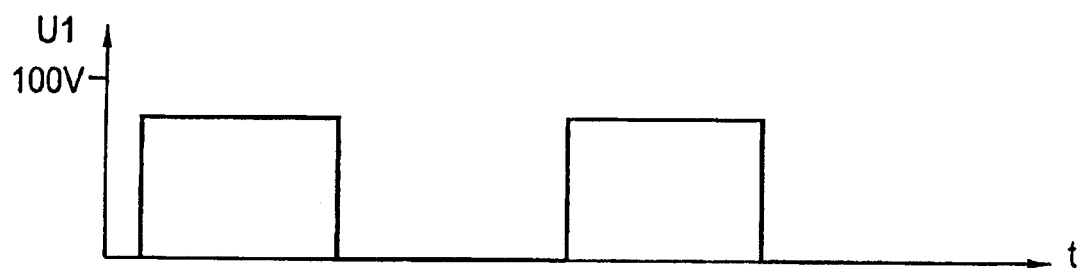
Figure 9:
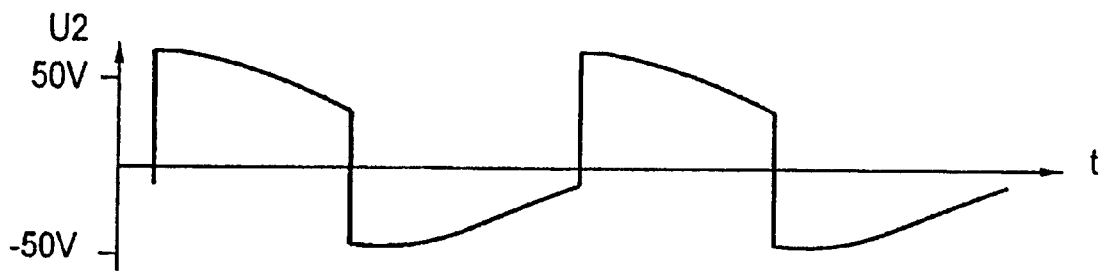
Figure 9:
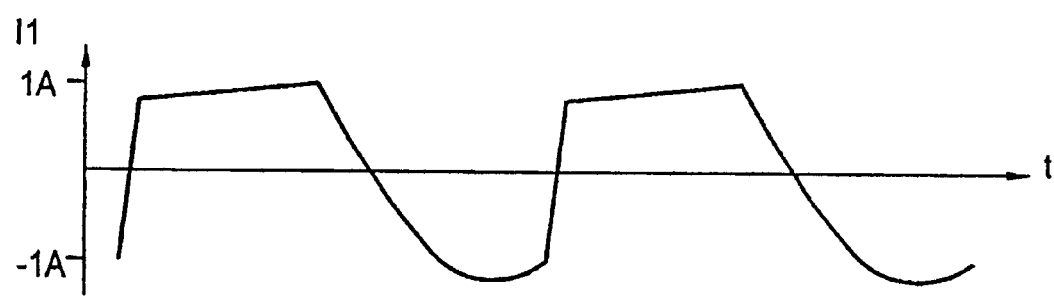
Figure 9:
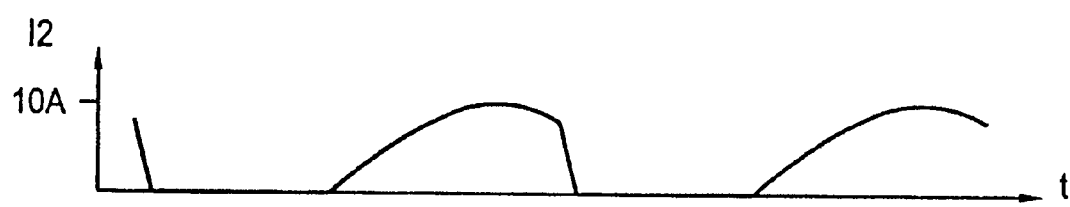
Figure 10:
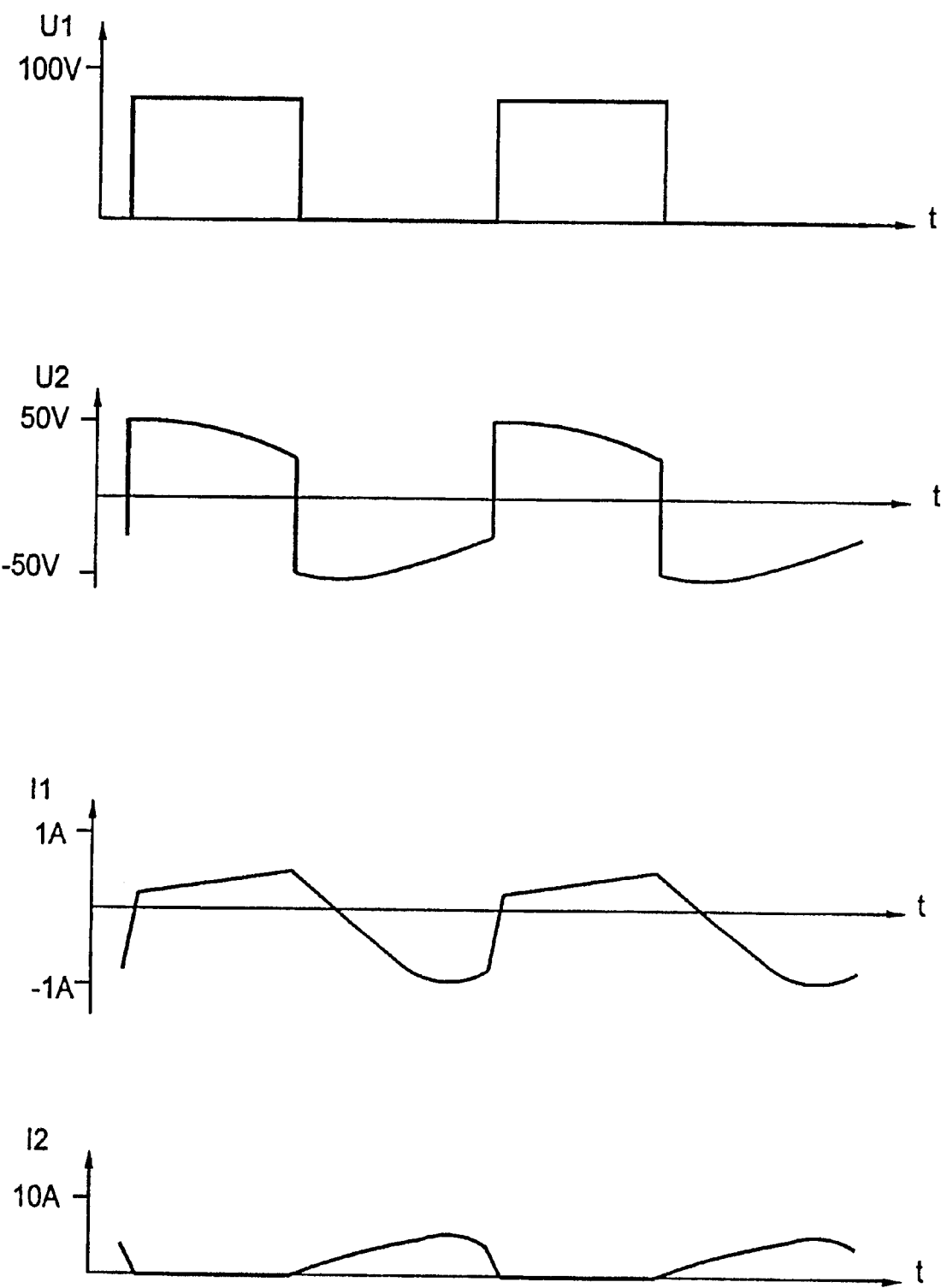

FIG. 7 shows a direct coupled voltage converter arranged according to the invention, FIG. 8 shows voltage and current waveforms in a known voltage converter, FIG. 9 shows voltage and current waveforms of a voltage converter according to the invention, and FIG. 10 shows voltage and current waveforms in a voltage converter according to the invention with a transformer that has a higher stray inductance and can nevertheless send the same power.

Like elements in the Figures are indicated by like references.

The voltage converters shown in FIGS. 1 to 4 individually comprise a half bridge of two controlled semiconductor switches $T_1$, $T_2$ each having a freewheeling diode, a transformer TR, a capacitor $C_{DC}$ and, connected to the secondary winding of the transformer TR, a rectifier circuit comprising a diode D and a capacitor $C_0$. Within the scope of the invention also other rectifier circuits may be used, for example, two-way rectifiers. In lieu of the single capacitor shown in the Figures, also filter circuits may be provided.

A DC voltage $V_i$ supplied from a voltage source is converted into a DC voltage $V_o$. The controlled semiconductor switches $T_1$, and $T_2$ are driven in phase opposition with pulses of constant frequency, but different pulse width, which width is predefined by a control circuit (not shown). The voltage converters shown in FIGS. 1 to 4 are distinguished by the half bridge end point to which the series combination of capacitor $C_{DC}$ and primary winding is connected, and also by the poling of the secondary winding. The basic operation, however, is the same and will be further explained with reference to FIGS. 8 to 10. The order of the capacitor and primary winding may also be reversed.

Figure 5:
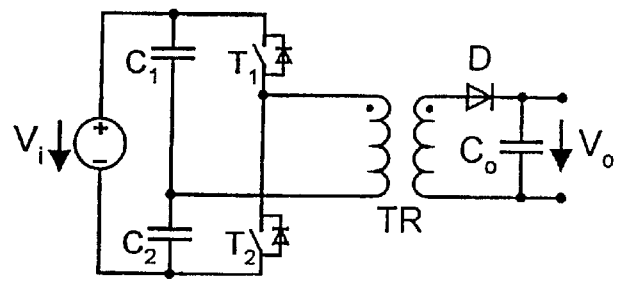
FIGS. 5 and 6 show examples of the second embodiment.
Figure 6:
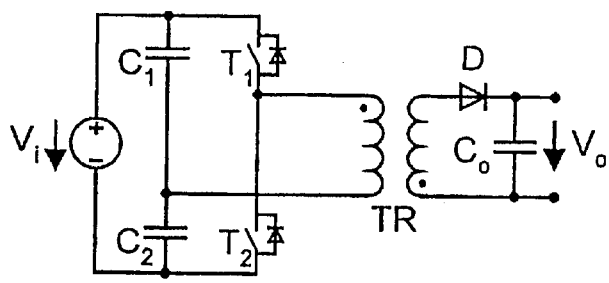

The second embodiment of the voltage converter according to the invention and as shown in FIGS. 5 and 6 has a further (passive) bridge arm comprising a series combination of the capacitors $C_1$ and $C_2$ whose tapping point is connected to the end of the primary winding of the transformer TR, while the other end is connected to the tapping point of the bridge arm of $T_1$, and $T_2$. The illustrative embodiments shown in FIGS. 5 and 6 are distinguished by their opposite poling of the secondary winding.

FIG. 7 shows a direct coupled voltage converter arranged according to the invention comprising a transverse coil $L_1$, and a longitudinal coil $L_2$. The further components correspond to those of FIGS. 1 to 4. This voltage converter does not have electric isolation, it is true, and no converter ratio that can be designed by the voltage ratio of the transformer, but can in many cases be used to advantage.

Figure 1:
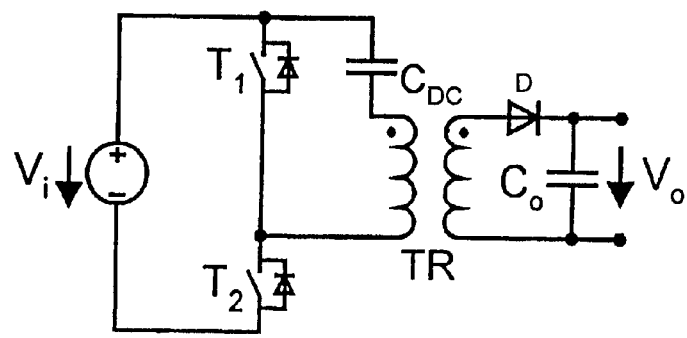
FIGS. 1 to 4 show various examples of the first embodiment.
Figure 2:
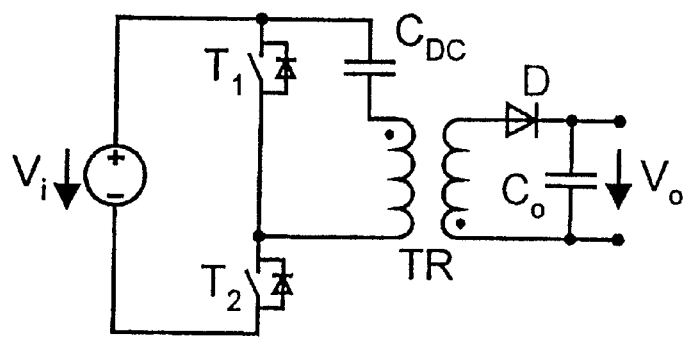
Figure 3:
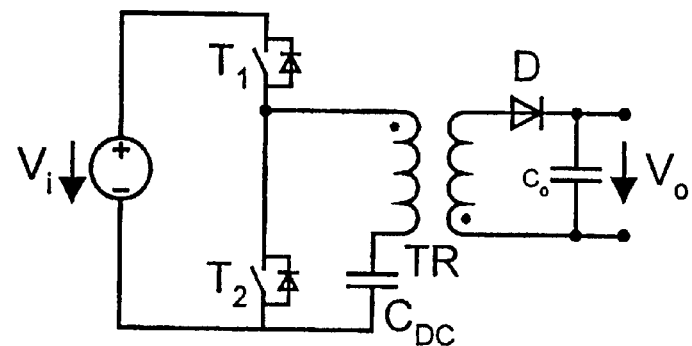
Figure 4:
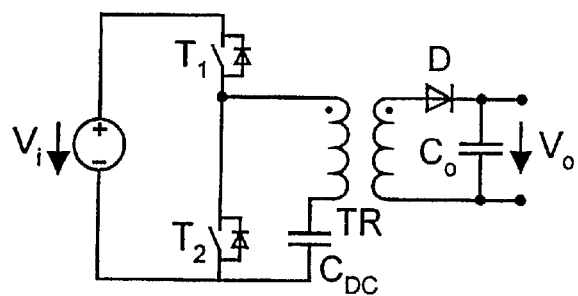

FIGS. 8 to 10 each show the time-dependent waveforms of the voltage U1 at the tapping point of the bridge arm, the voltage U2 on the primary winding, the current I1 through the primary winding and the current I2 through the secondary winding and through the diode D in a voltage converter shown in FIG. 3.

In the known circuit whose voltage and current waveforms are shown in FIG. 8 and in the two voltage converters according to the invention (FIGS. 9 and 10), U1 is rectangular having an amplitude of about 80V in this example. In the known circuit (FIG. 8) also the voltage U2 on the primary winding is rectangular, in essence, but without a DC component.

The representation of U2 in FIG. 8 shows small pulse tilts which are determined by the capacitor $C_{DC}$ not being infinitely large. However, they do not have any noticeable influence on the function of the known circuit.

The current I1 in the known voltage converter (FIG. 8) rapidly rises each time after a positive edge of the voltage U2 and after that rises slowly. The proportionally slow rise is determined in that the transformer is operated in the idle mode by the blocking effect of the diode D during this time slot, so that a series combination of the stray inductance and the main inductance of the secondary winding is active. During this time the current I2=0.

The negative edge of U2 causes the secondary voltage to reverse, so that the diode D becomes conductive. This provides that only the stray inductance of the primary winding is operative for the next current waveform so that a relatively fast linear current change takes place until the next positive edge of U2. Accordingly, I2 rises linearly. The diagrams make clear that high peak currents are necessary to achieve a predefined output power.

In the voltage converter according to the invention, whose voltage and current waveforms are shown in FIGS. 9 and 10, the voltage $U_2$ noticeably drops during the individual half waves. The measured peak-to-peak value of voltage U2 then becomes larger since the edges remain the same, but start from lower voltage values. As a result of this changed shape of the curve of the voltage U2, the waveforms of I1 and I2 are not strongly affected during the positive half waves of the voltage U2, but the waveform during the negative half wave shows a considerable bend. The maximum value is not just reached at the next positive edge, but considerably earlier, so that the area of waveform I2, that is the quantity of charge, becomes considerably larger for each period of the oscillation that reaches the capacitor C0.

Whereas the voltage and current waveforms shown in FIG. 9 are based on a value of $C_{DC}$=100 nF and a stray inductance of 35 $\mu$H, the voltage waveforms shown in FIG. 10 are based on $C_{DC}$=63 nF and a considerably higher stray inductance of 76 $\mu$H.

Whereas FIG. 9 shows the advantage of the larger power that can be sent with the same transformer, FIG. 10 clarifies that when the transformer is poorer and peak currents are lower the voltage converter according to the invention sends the same power as a known voltage converter.

What is claimed is:

1. A voltage converter comprising a half bridge of controlled semiconductor switches, a transformer and a rectifier circuit, a primary winding of the transformer in series with at least one capacitor being connected to the half bridge, characterized in that the at least one capacitor ($C_{DC}$; $C_1$, $C_2$) is designed such that the resonant frequency of the series combination comprising the at least one capacitor ($C_{DC}$; $C_1$, $C_2$) and an inductance that is active when the rectifier circuit is in operation is larger than half the pulse frequency with which the semiconductor switches ($T_1$, $T_2$) are controlled.

2. A voltage converter as claimed in claim 1, characterized in that a coil is connected in series with a transformer (TR) and the at least one capacitor ($C_{DC}$; $C_1$, $C_2$).

3. A voltage converter as claimed in claim 1, characterized in that a series combination of the primary winding and the at least one capacitor ($C_{DC}$) is arranged between the tapping point and one of the end points of the half bridge ($T_1$, $T_2$).

4. A voltage converter as claimed in claim 1, characterized in that two capacitors ($C_1$, $C_2$) form a further bridge arm and in that the primary winding is arranged between the tapping point of the half bridge ($T_1$, $T_2$) and that of the further bridge arm ($C_1$, $C_2$).

5. A voltage converter comprising a half bridge of controlled semiconductor switches, a longitudinal coil and a transverse coil connected in series to at least one capacitor being connected to the half bridge and a rectifier circuit being connected in parallel with the transverse coil, characterized in that the at least one capacitor is designed such that the resonant frequency of the series combination of the at least one capacitor and the longitudinal coil is larger than half the pulse frequency with which the semiconductor switches are controlled.

* * * * *